(12) United States Patent
Kondo

(10) Patent No.: US 7,639,594 B2
(45) Date of Patent: *Dec. 29, 2009

(54) INFORMATION RECORDING CARRIER AND METHOD OF REPRODUCING THE SAME

(75) Inventor: Tetsuya Kondo, Kanagawa-ken (JP)

(73) Assignee: Victor Company of Japan, Limited, Yokohama (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/153,498

(22) Filed: May 20, 2008

(65) Prior Publication Data

US 2008/0259782 A1 Oct. 23, 2008

Related U.S. Application Data

(63) Continuation of application No. 11/434,136, filed on May 16, 2006, now Pat. No. 7,391,709, which is a continuation of application No. 10/245,757, filed on Sep. 18, 2002, now Pat. No. 7,088,670.

(30) Foreign Application Priority Data

Sep. 20, 2001 (JP) ............................ P2001-286516
Mar. 25, 2002 (JP) ............................ P2002-082758

(51) Int. Cl.
*G11B 7/24* (2006.01)
(52) U.S. Cl. .................. 369/275.4; 369/47.4
(58) Field of Classification Search ... 369/275.1–275.5, 369/283, 44.13, 44.36, 47.4, 44.11, 44.22, 369/47.1, 47.27, 59.25, 30.07
See application file for complete search history.

(56) References Cited

U.S. PATENT DOCUMENTS

| 7,391,709 | B2 * | 6/2008 | Kondo | 369/275.4 |
| 7,420,911 | B2 * | 9/2008 | Kondo | 369/275.4 |
| 7,440,390 | B2 * | 10/2008 | Kondo | 369/275.4 |
| 7,535,818 | B2 * | 5/2009 | Kondo | 369/275.4 |
| 2009/0067312 | A1 * | 3/2009 | Kondo | 369/100 |

FOREIGN PATENT DOCUMENTS

EP 1 115 109 A 7/2001

* cited by examiner

*Primary Examiner*—Ali Neyzari
(74) *Attorney, Agent, or Firm*—The Nath Law Group; Jerald L. Meyer; Sungyeop Chung

(57) ABSTRACT

An information recording carrier according to one embodiment has minute pattern including plural grooves or lands formed to be substantially in parallel and adjacent each other and comprises a supporting body having the minute pattern, a recording layer formed on the minute pattern formed on the supporting layer and a light transmission layer formed on the recording layer. The minute pattern is formed under a relation of $P<\lambda/NA$, where a pitch of each groove or land is P, a wavelength of a laser beam is $\lambda$ and a numerical aperture of an objective lens is NA. The plural grooves or lands have at least a wobbling region and data is recorded wobblingly in the wobbling region by frequency shift modulation. A phase relation between a high frequency portion and a low frequency portion composing the frequency shift modulation is $\pm(\pi/20.5)$ to $\pm(\pi/0.75)$.

2 Claims, 11 Drawing Sheets

| BEFORE BASE BAND MODULATION | AFTER BASE BAND MODULATION |
|---|---|
| 0 | 00, 11 |
| 1 | 01, 10 |

| BEFORE BASE BAND MODULATION | 1 0 0 0 1 |
|---|---|
| AFTER BASE BAND MODULATION | 010011001101 |

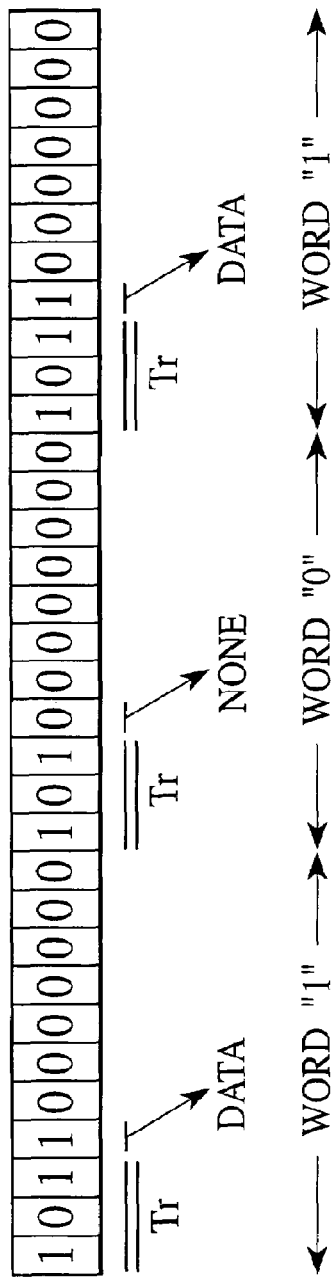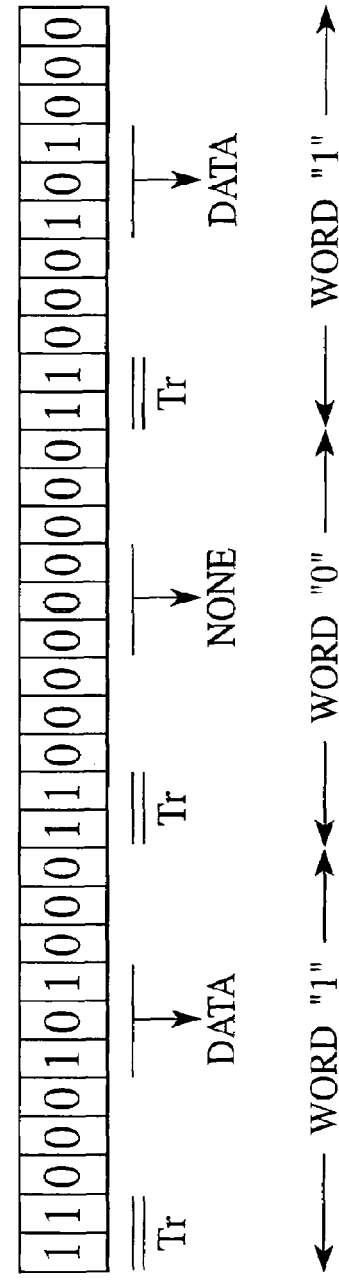

INFORMATION RECORDING CARRIER AND METHOD OF REPRODUCING THE SAME

This application is a continuation application of U.S. patent application Ser. No. 11/434,136, filed May 16, 2006 now U.S. Pat. No. 7,391,709 which is a continuation application of U.S. patent application Ser. No. 10/245,757, filed Sep. 18, 2002 now U.S. Pat. No. 7,088,670 issued Aug. 8, 2006 the entire content of which is hereby incorporated by reference in its entirety.

BACKGROUND OF THE INVENTION

1. Field of the Invention

The present invention relates to an information recording carrier for use in system for recording and/or reproducing information by optical means.

2. Description of the Related Art

Conventionally, a system for reading out information by moving the information recording carrier relatively has been available and optical means, magnetic means and electrostatic capacity means are used for reproducing information therefrom. Of them, the system for recording and/or reproducing information by the optical means has prevailed widely in daily life ("recording/reproducing" mentioned here means three statuses, namely, only recording, only reproduction or recording and reproduction).

For example, as a recording/reproducing type information recording carrier using beam having wavelength λ=650 nm, DVD-RAM, DVD-RW ("DVD" means digital versatile disc) and the like are available.

Although the recording/reproducing type information recording carriers have been developed as actual products and marketed, the technology for burying address information into such recording/reproducing type information recording carrier effectively has been still being developed and a next generation information recording carrier will need improvement of the conventional address recording technology or a new address recording technology.

The first purpose for burying address information effectively is to bury address information at a low error rate without substantially decreasing an area provided for recording/reproducing, and the second purpose is to bury the address information by suppressing the error rate of recording mark so that buried address information never interferes with a main recording/reproducing region.

As for the first object, for example, in the information-recording carrier employing a header type address represented by DVD-RAM (DVD rewritable), the address information is recorded by pit row (called header) by cutting a main recording/reproducing region. Because the header has the same format as the reproduction dedicated information-recording carrier, the error rate of the address information is suppressed very low.

However, because recording cannot be achieved in this header region, the entire capacity of an information-recording carrier whose area is limited drops. Thus, address recording system not using the header is necessary.

As for the second object, in the information recording carrier employing land pre-pit type address represented by for example, DVD-RW (DVD rerecordable), the recording/reproducing region is continuous and has no cut area. Although the address information is prepared as pits, that pits (land pre-pits) are dispersed widely so that they are recorded between a recording track and another recording track.

Thus, although the recording capacity does not drop, the land pre-pit and the recording signal (recording mark) interfere with each other because they are disposed in parallel. Consequently, the error rate of address rises so that the error rate of the recording mark may rise in some cases. Thus, an address recording system using no land pre-pit is necessary.

To solve such a request, there is a method for recording the address information by forming a groove substantially parallel to the information recording carrier continuously such that it is wobbled.

For example, for the rewritable DVD disc (so-called DVD+RW) described in ECMA/TC31/99/43, an address recording method of wobbling the groove by phase shift modulation is determined. Because according to this recording method, an address is recorded in the groove by phase shift modulation, the header is not necessary and the capacity is not lost.

FIG. 1 shows the concept of the phase shift modulation in this rewritable DVD disc.

As the minute pattern, plural substantially parallel groove continuities 150 are formed. Each of the continuities 150 is comprised of a groove 151 and an inter-groove portion 152 such that both are formed substantially parallel to each other.

In the meantime, the groove 151 and the inter-groove portion 152 have different heights (a difference in height is for example, $\lambda/8n$ when the recording wavelength is $\lambda$ and the refractivity of a recording light transmitting member is n). Then, the groove 151 is wobbled in the shape of sine wave.

The address is recorded such that phase information is given to this groove 151 as shown in FIG. 2. That is, sin 0 and sin π are handled as 0 and 1 when the address information is recorded. Because upon reproduction, a phase switching point 153 is loaded with the address information, it can be reproduced by for example, envelop phase detection of the push-pull signal.

If the address information is recorded by phase shift modulation like this, the header is not necessary and the capacity is not lost. Further, reproduction is enabled by well known envelope phase detection.

When the inventor of the present invention considered this address recording method under various unfavorable conditions, more specifically, recorded user data into the groove 151 in a disc of phase change type created based on this method and tried to reproduce the address, it was found that the recorded user data leaked into the address signal thereby causing a trouble in address detection.

The frequencies for the recording data and address information never overlap because their information densities are different. However, in viewpoint of address reproduction, recording user data acted like noise and it was found that detection of the address, more specifically detection of the phase switching point 153 was often mistaken. Although when the reproduction by envelope phase detection was replaced with the reproduction by synchronous phase detection as its countermeasure, the error rate dropped by about 1 digit, the effect was not sufficient.

Further, wobbling of the sine wave was increased so as to reduce the error rate. In this case, although there was some extent of the effect, interference increased so that the error rate of user recording worsened or in worst case, the tracking became unstable.

This problem is originated from a fact that this address recording method depends on minute change in shape of the phase switching point 153.

Further, under this address recording method, address in adjacent tracks leaked so that it was mixed into main address about once every several tracks. As a result, not only the phase switching point 153 is difficult to detect, but also this phenomenon reduces the reliability of the information recording carrier remarkably.

Thus, a novel recording method by other modulation than the phase shift modulation and based on the groove continuity structure by making advantage of data recording by wobbled groove has been demanded.

Therefore, the present invention proposes a groove modulation method, which can replace the phase shift modulation so as to bury the address information effectively.

More specifically, the first object is to bury address at a low error rate without reducing the area provided for recording/reproduction, the second object is to bury the address by suppressing the error rate of a recording mark so that it does not interfere with the main recording/reproduction region. The third object is to construct so that the buried address does not interfere with adjacent addresses.

In the meantime, the present invention considers that gallium nitride base compound semiconductor light emission device (for example, described in Japanese Patent No. 2778405) recently developed to raise the recording density of the information recording carrier, that is, short-wave laser which emits light in the vicinity of $\lambda=350$ to 450 nm produces more noise than a conventional laser.

Further, although technology for forming the information recording carrier in multiple layers so as to increase its recording capacity has been well known, it must be considered that noise in the reproducing system is increased by this multiple-layers.

Further, the present invention aims at corresponding to a recently developed light transmission layer incident information recording carrier from viewpoints of physical structure.

SUMMARY OF THE INVENTION

An object of the present invention is to provide an information recording carrier in which the address is buried effectively by referring to such updated technological background.

To achieve the above object, there is provided an information recording carrier having minute pattern including plural grooves or lands formed to be substantially in parallel and adjacent each other, wherein when a pitch of each groove or land is P, a wavelength of a laser beam is $\lambda$ and a numerical aperture of an objective lens is NA, the minute pattern is formed under a relation of $P<\lambda/NA$, the plural grooves or lands include at least a wobbling region and data is recorded wobblingly in the wobbling region by frequency shift modulation.

In a preferred embodiment of the present invention, the wobbling region is comprised of a region subjected to wobbling recording by frequency shift modulation and a region subjected to wobbling recording at a single frequency.

In a preferred embodiment of the present invention, digital recording using the frequency shift modulation is carried out by frequency shift modulation in which with a predetermined frequency having either of 1-100 waves as a channel bit, the frequency is changed over for each channel bit.

In a preferred embodiment of the present invention, a phase relation between a high frequency portion and a low frequency portion composing the frequency shift modulation is $\pm(\pi/20.5)$ to $\pm(\pi/0.75)$.

In a preferred embodiment of the present invention, a phase of a high frequency portion and a phase of a low frequency portion are continuous at a border between the high frequency portion and the low frequency portion composing the frequency shift modulation.

In a preferred embodiment of the present invention, the phase relation between the high frequency portion and the low frequency portion composing the frequency shift modulation is $\pm(\pi/2.5)$ and a phase of the high frequency portion and a phase of the low frequency portion are continuous at a border between the high frequency portion and the low frequency portion.

Further, to achieve the above object, there is provided an information recording carrier having minute pattern including plural grooves or lands formed to be substantially in parallel and adjacent each other, comprising: a supporting body having the minute pattern; a recording layer formed on the minute pattern formed on the supporting body; and a light transmission layer formed on the recording layer, wherein when a pitch of each groove or land is P, a wavelength of a laser beam is $\lambda$ and a numerical aperture of an objective lens is NA, the minute pattern is formed under a relation of $P<\lambda/NA$, the plural grooves or lands have at least a wobbling region and data is recorded wobblingly in the wobbling region by frequency shift modulation.

In a preferred embodiment of the present invention, the wobbling region is comprised of a region subjected to wobbling recording by frequency shift modulation and a region subjected to wobbling recording at a single frequency.

In a preferred embodiment of the present invention, digital recording using the frequency shift modulation is carried out by frequency shift modulation in which with a predetermined frequency having either of 1-100 waves as a channel bit, the frequency is changed over for each channel bit.

In a preferred embodiment of the present invention, a phase relation between a high frequency portion and a low frequency portion composing the frequency shift modulation is $\pm(\pi/20.5)$ to $\pm(\pi/0.75)$.

In a preferred embodiment of the present invention, a phase of a high frequency portion and a phase of a low frequency portion are continuous at a border between the high frequency portion and the low frequency portion composing the frequency shift modulation.

In a preferred embodiment of the present invention, the phase relation between the high frequency portion and the low frequency portion composing the frequency shift modulation is $\pm(\pi/2.5)$ and a phase of the high frequency portion and a phase of the low frequency portion are continuous at a border between the high frequency portion and the low frequency portion.

The nature, principle and utility of the invention will become more apparent from the following detailed description when read in conjunction with the accompanying drawings.

BRIEF DESCRIPTION OF THE DRAWINGS

In the accompanying drawings:

FIG. 18 is a diagram showing a first example of address information dispersion recording;

FIG. 19 is a diagram showing a second example of address information dispersion recording;

DESCRIPTION OF THE PREFERRED EMBODIMENTS

Hereinafter, the preferred embodiments of the present invention will be described with reference to FIGS. 3 to 21.

First, a preferred embodiment of the present invention will be described with reference to FIGS. 3, 4.

An information recording carrier 1 of this embodiment of the present invention executes at least one of recording and reproduction mainly by means of optical means.

This information recording carrier 1 is, for example, phase change recording type information recording carrier, pigment type information recording carrier, magneto-optical type information recording carrier, light-assist magnetic type information recording carrier.

Figure 1:
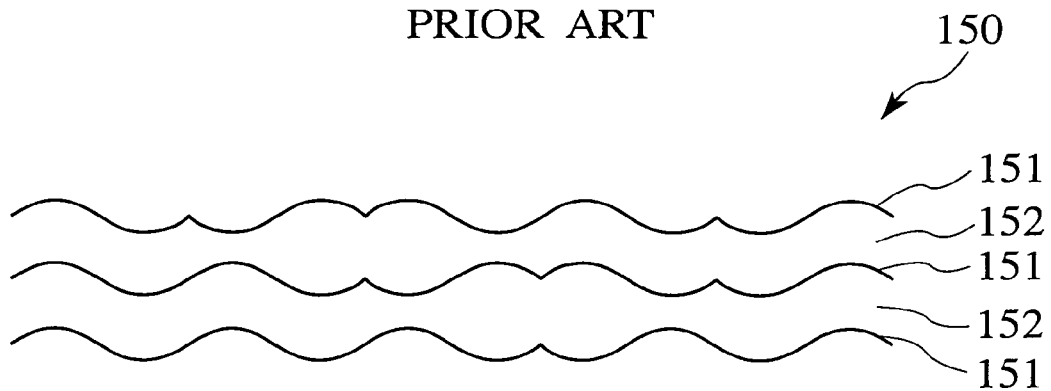
FIG. 1 is a conceptual diagram of phase-shift modulation in a rewritable DVD disc.
Figure 2:
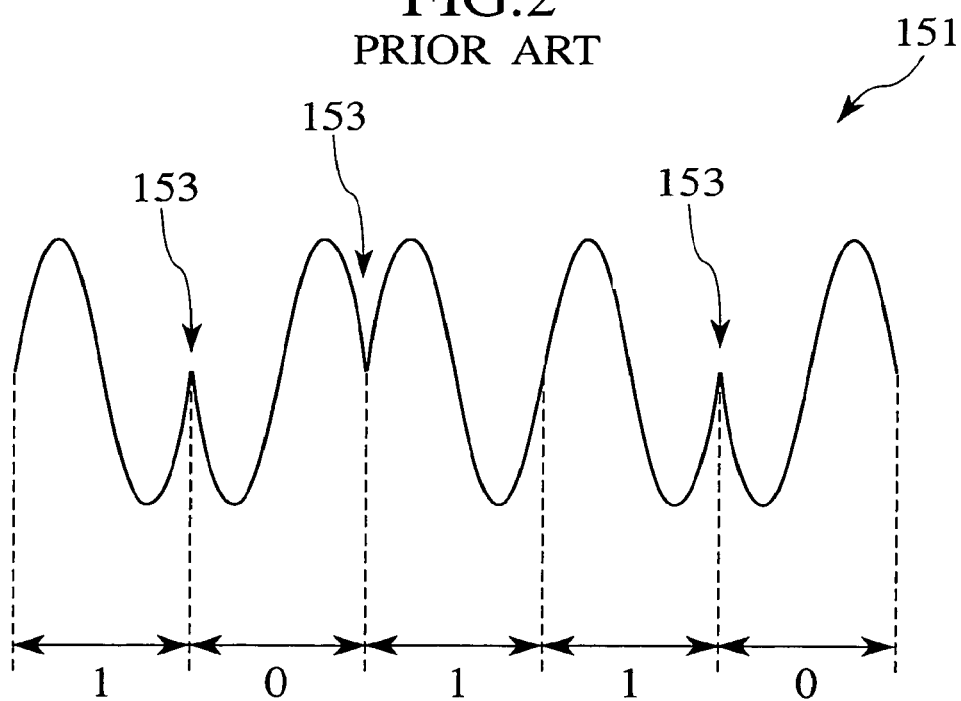
FIG. 2 is a conceptual diagram of the recording status of address information in the rewritable DVD disc.
Figure 3:
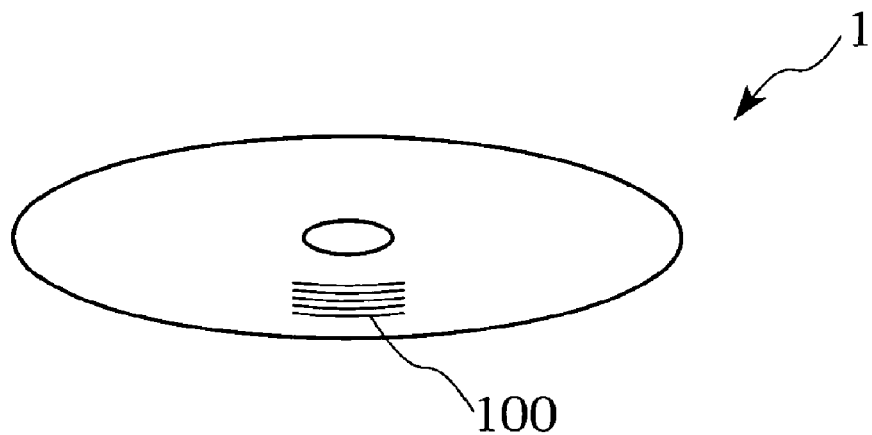
FIG. 3 is a diagram showing an example of the information recording carrier of the present invention.

As shown in FIG. 3, uneven fine patterns are formed in the surface (laser beam irradiating face) of the information recording carrier 1 or inside thereof as a recording/reproducing region and its plane structure is composed of parallel groove continuity 100 formed such that plural grooves substantially parallel adjoin each other.

Although an example of FIG. 3 indicates only part of the parallel groove continuity 100 in circular shape, this circular shape may be continuous around 360° coaxially or spirally.

Although FIG. 3 represents the information recording carrier 1 as a circle, the present invention is not restricted to such a shape.

Figure 4:
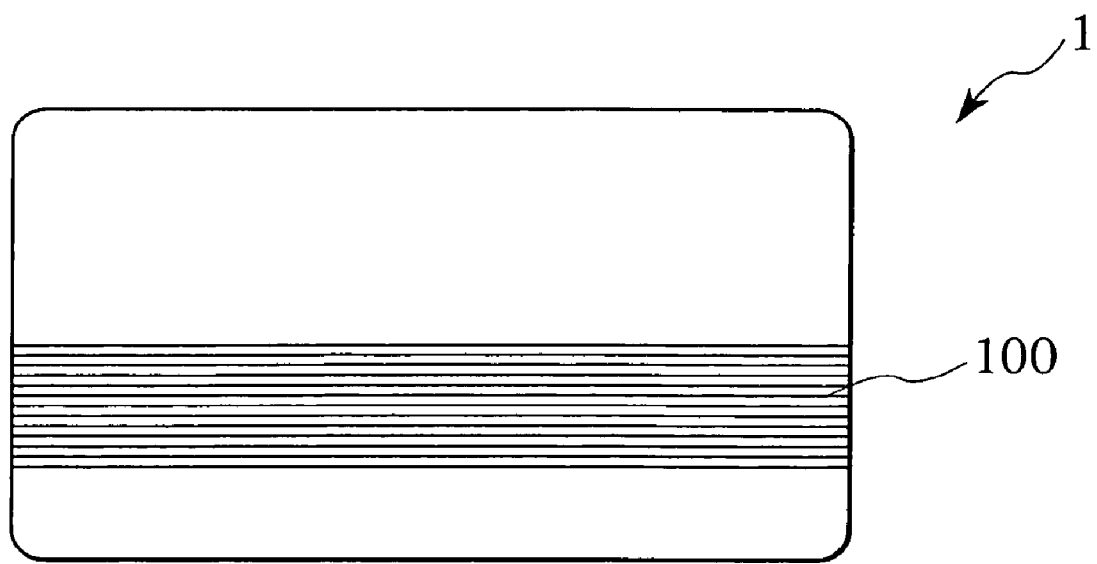
FIG. 4 is a diagram showing other example of the information recording carrier of the present invention.

Further, the information recording carrier 1 may be formed in the form of a card shown in FIG. 4 and particularly, the parallel groove continuity 100 may be formed in parallel to a side of this card.

Figure 5:
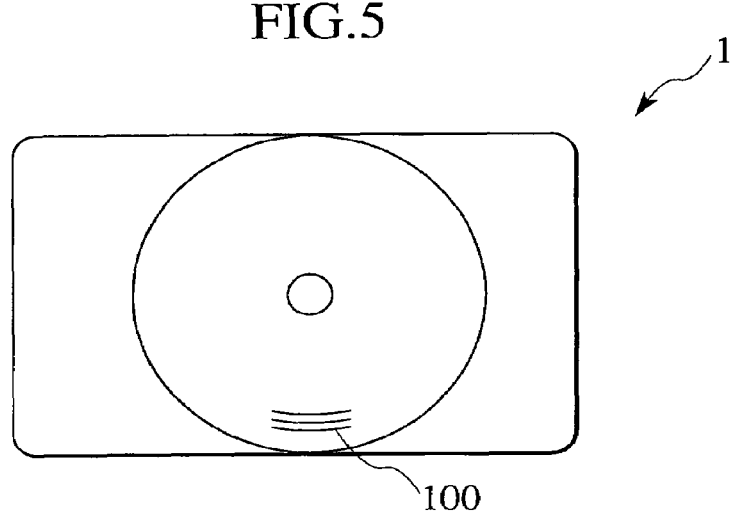
FIG. 5 is a diagram showing still other example of the information recording carrier of the present invention.

Further, the information recording carrier 1 may be formed in the form of a card shown in FIG. 5 and the parallel groove continuity 100 may be formed circularly like FIG. 3.

Additionally, although not shown, the information recording carrier 1 may be formed in the form of a tape or may be bored.

In the meantime, data to be recorded under the present invention is digital data, which is recorded at least in part of the parallel groove continuity 100 in the form of the shape of a groove. Therefore, this is permanent data which cannot be rewritten.

The type of data to be recorded is not particularly specified, but address information, copy protection information, encrypted information, encryption key and the like can be recorded.

The address information mentioned here refers to data selected from absolute address allocated to the entire information recording carrier 1, relative address allocated to a partial region, track number, sector number, frame number, field number, time information, error correction code and the like, for example, data obtained by converting decimal or hexadecimal data to binary data (including examples of BCD code or gray code).

To facilitate understanding, following description will handle digital data to be recorded as address information.

Figure 6:
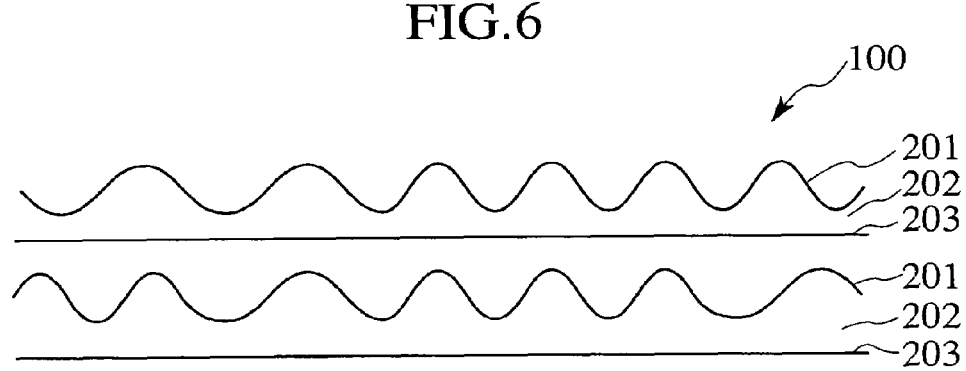
FIG. 6 is a diagram showing plane fine structure in the information recording carrier of the present invention.

FIG. 6 shows a plane fine structure obtained by enlarging the parallel groove continuity 100 described in FIGS. 3 to 5.

Referring to FIG. 6, a parallel groove continuity 100 comprises a track 201 having at least a wobbling region and a track 203 having at least liner groove region, and these tracks are constructed substantially in parallel in macro viewpoint while they are formed alternately.

An interval between the track 201 having the wobbling groove region and the track 203 having the linear groove region is called inter-groove portion 202. The track 201 having the wobbling groove region and the track 203 having the linear groove region have the same height, which is different from the height of the inter-groove portion 202.

In the information recording carrier of the present invention, $P<\lambda/NA$ is established when the pitch between the track 201 having the wobbling groove region and the track 203 having the linear groove region is P, the wavelength of reproduction light for reproducing the information recording carrier 1 of the present invention is $\lambda$ and the numerical aperture of an objective lens is NA.

For example, when $\lambda=650$ nm and NA=0.6 like DVD, P<1083 nm is established.

If for example, gallium nitride base compound semiconductor light emission device and a high NA pickup are used, P<476 nm is established when $\lambda=405$ nm and NA=0.85 are set up.

Although the track 201 having the wobbling groove region and the track 203 having the linear groove region are drawn narrower than the inter-groove portion 202 in the same Figure, the groove width of each is not limited. Further, the width of the track 201 having the wobbling groove region and the width of the track 203 having the linear groove region may be the same or different from each other.

The wobbling basic wave is not restricted to sine wave, but may be triangular wave or rectangular wave. Particularly if the sine wave is selected, no high frequency component is contained, so that excellent quality recording whose band is restricted is achieved. The track 201 having the wobbling groove region and the track 203 having the linear groove region may be both linear, coaxial or spiral. Particularly, in case of the circle or circular parallel groove continuity 100 shown in FIG. 3 or 5, the track 201 having the wobbling groove region records at constant angular velocity (CAV) or at constant linear velocity (CLV) or zone constant angular velocity (ZCAV) or zone constant linear velocity (ZCLV) in which a different zone is formed depending on the radius so that control of each zone is different.

The track 203 having the linear groove region may be continuous line over 360°.

What is important here is that the wobbling groove region and the linear groove region are disposed alternately adjacent each other and particularly in case of a disc-like information recording medium, these regions are disposed alternately adjacent each other in the radial direction.

The track 201 having the wobbling groove region records data in the form of a shape gained by frequency-shift modulation and more specifically, the same track is composed of plural portions gained by wobbling the groove at each specific frequency.

More specifically, binary data is recorded in a shape by frequency-shift modulation using high frequency portion and low frequency portion. If n value data is of multiple value, that data is recorded in a shape by frequency shift modulation using frequency portions of n kinds. An example in which the data is binary will be described with reference to FIG. 7.

Figure 7:
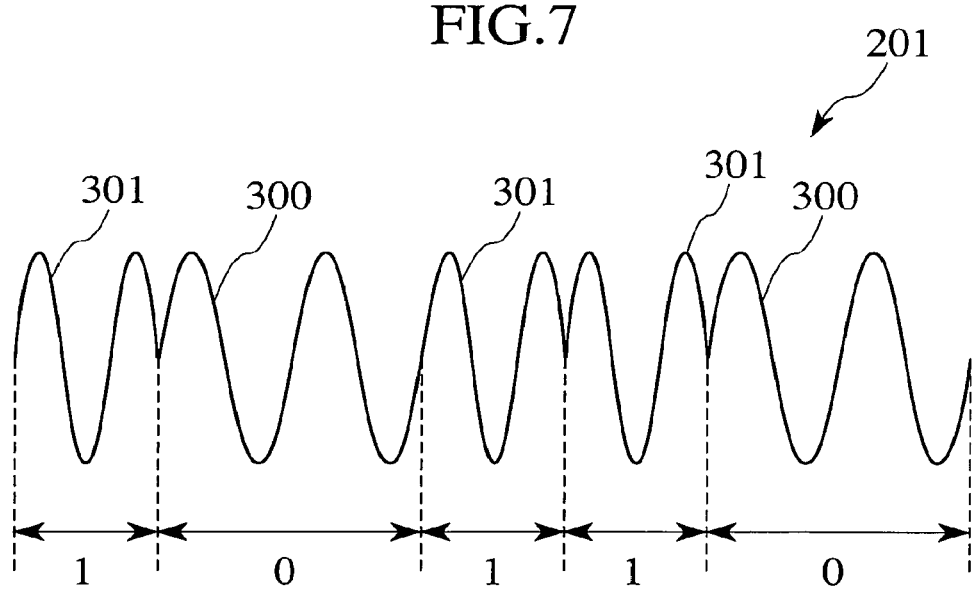
FIG. 7 is a diagram showing the structure of a groove formed in the information recording carrier of the present invention.

FIG. 7 shows an example in which data 1, 0, 1, 1, 0 are recorded in a shape, comprising high frequency portions 301 and low frequency portions 300.

The high frequency portion 301 and the low frequency portion 300 correspond to data bits 1 and 0 respectively. The frequency is changed for each channel bit so as to carry out digital recording.

Here, the number of waves constituting each frequency is not limited but the frequency is composed of one or more waves. However, if it is considered to detect the frequency in a reproducing apparatus accurately and to hamper excessive redundancy in order to acquire some extent of data transmission velocity, preferably the frequency portion corresponding to each data bit is constituted in the range of 1 to 100 waves, more preferably 1 to 30 waves.

The high frequency portion 301 and the low frequency portion 300 may coincide with each other in terms of amplitude. However, there is no restriction in amplitude ratio and considering the frequency characteristic of the reproducing apparatus, the amplitude of the high frequency portion 301 may be formed larger than that of the low frequency portion 300.

In any case, there need to be the relation of $\Delta<P$ between the amplitude $\Delta$ and the pitch P.

In such a way, the track 201 having the wobbling groove region and the track 203 having the linear groove region are so constructed not to contact each other at all, and therefore, addresses subjected to frequency shift modulation in different tracks 201 are prevented from mixing together upon reproduction.

In the meantime, the amplitude $\Delta$ refers to the amount of deflection from the center line of frequency shift modulation up to the maximum point or minimum point of the wave.

It is permissible to use push-pull method for reading of recorded data like the case of phase-shift modulation.

The information recording carrier 1 of the present invention never restricts the physical length and amplitude of a channel bit constituted of the high frequency portion 301 and the low frequency portion 300.

For example, in FIG. 7, the physical length of the low frequency portion 300 is set longer than that of the high frequency portion 301.

Figure 8:
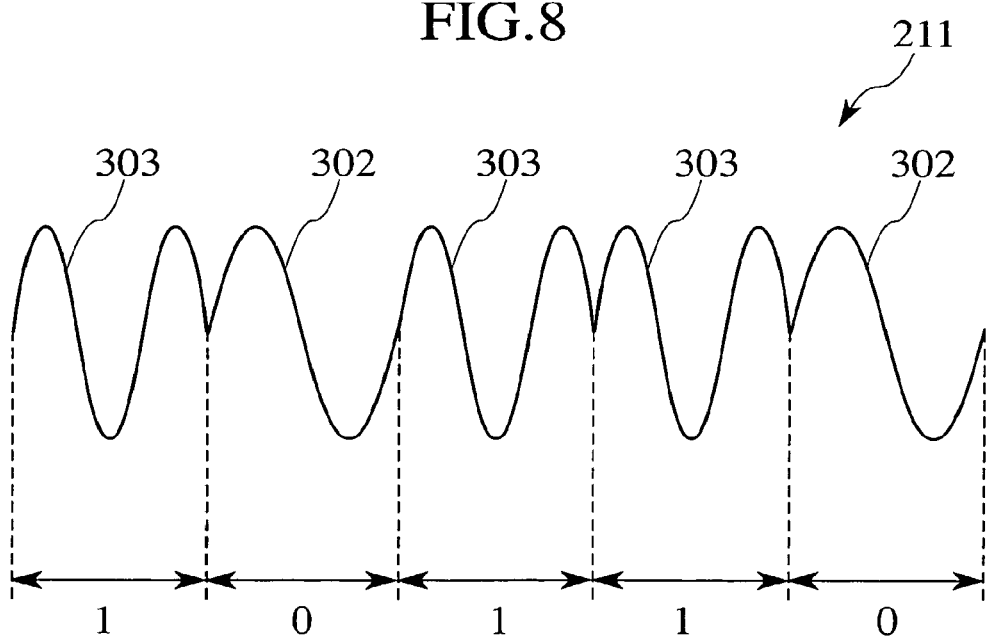
FIG. 8 is a diagram showing other structure of a groove formed in the information recording carrier of the present invention.

Like the track 211 having the wobbling groove region shown in FIG. 8, it is permissible that the amplitudes of the high frequency portion 303 and the low frequency portion 302 are equal while the length of the high frequency portion 301 is equal to that of the low frequency portion 302.

Consequently, 0, 1 determination can be carried out with an ample amplitude threshold upon reproduction and series data can be read under a single time threshold, thereby simplifying a reproduction circuit.

Further, even if there is a jitter (deflection in time axis direction) in reproduced data, there is an advantage that its influence can be minimized. If a code to be recorded is ideally symmetrical, the total lengths of the high frequency portion 301 and the low frequency portion 302 are equal, so that there is no direct current component in the reproduced signal.

As a result, there is generated no load on data decoding or servo, which is advantageous.

In FIGS. 7, 8, the high frequency portion 301 and the low frequency portion 302 are so connected as to rise at a switching point of the channel bit. However, because a phase jump occurs with a probability of 50% at this time, high frequency component is generated thereby worsening power efficiency per frequency.

Figures 9, 10, 11:
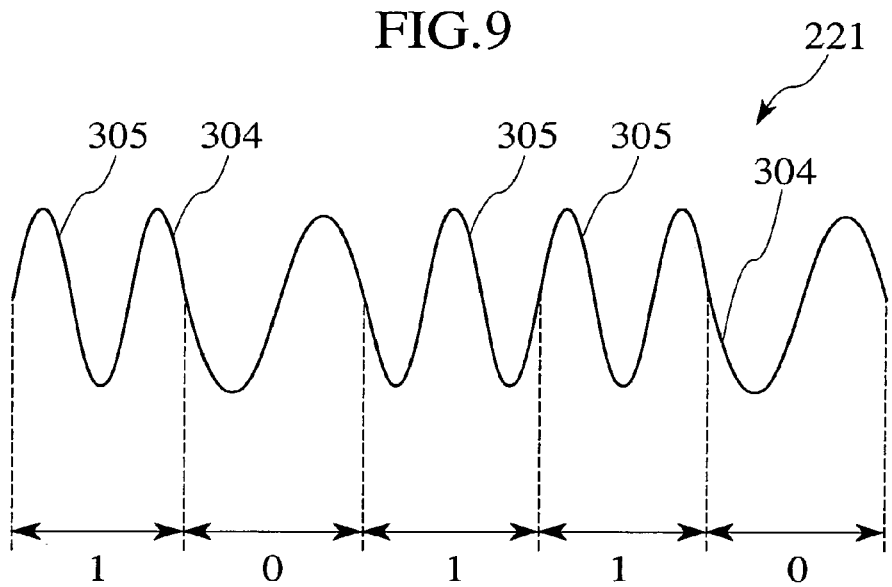
FIG. 9 is a diagram showing still other structure of a groove formed in the information recording carrier of the present invention.
FIG. 10 is a diagram showing a change in data between before base band modulation and after base band modulation.
FIG. 11 is a diagram showing a specific example of a change in data between before base band modulation and after base band modulation.

FIG. 9 shows an example in which the high frequency portion 301 and the low frequency portion 302 are allocated to maintain the phase continuity at the switching point of the channel bit in the wobbling groove region 221 in order to improve such a problem.

That is, the start phase of the low frequency portion 304 is selected so that the end of the high frequency portion 305 and the start of the low frequency portion 304 are in the same phase direction. An inverse case is the same, accordingly the start phase of the high frequency portion 305 is selected so that the end of the low frequency portion 304 and the start of the high frequency portion 305 are in the same phase direction. Such a selection maintains continuity of the phase, improves power efficiency and makes reproduction envelope constant, thereby improving data error rate of the information recording carrier 1.

Although selection of each frequency of the high frequency portion 301 and the low frequency portion 302 is arbitrary, the frequency of the high frequency portion 301 is required not to be so much higher than that of the low frequency portion 302 in order to avoid an interference with the frequency band for user to record data in the information recording carrier 1.

On the other hand, it is desirable to possess some extent of a difference in frequency between the high frequency portion 301 and the low frequency portion 302 and thus maintain an excellent separation performance in order to ensure an excellent reproduction error rate for address data.

In this viewpoint, the frequency ratio (high frequency/low frequency) between the high frequency portion 301 and the low frequency portion 302 is desired to be in the range of 1.05 to 5.0, particularly in the range of 1.09 to 1.67.

In other words, when the reference phase is set to $2\pi$, the phase relation of the two frequencies is preferred to be in the range of $2\pi\pm(\pi/20.5)$ to $\pm(\pi/0.75)$, particularly in the range of $2\pi\pm(\pi/12)$ to $\pm(\pi/2)$ (that is, $360°\pm15°$ to $\pm90°$).

Particularly if the frequency ratio (high frequency/low frequency) is 1.5 as shown in a diagram of FIG. 9, the two frequencies are in the relation that they are obtained by shifting the phase of a single wave by $-\pi/2.5$ (high frequency) and $+\pi/2.5$ (low frequency) (that is, $2\pi\pm(\pi/2.5)$ when the reference phase is $2\pi$). In other words, the two frequencies are in the relation that they are shifted into $360\pm72°$ These two frequencies can be expressed with an integer time (three times or twice) a single frequency (0.5 here). Therefore, there is such an advantage that the demodulating circuit can be simplified. Further, a circuit having the 0.5 window facilitates generation of clocks. Further, demodulation can be executed by means of a synchronous detection circuit.

As described above, the information recording carrier 1 of the present invention comprises a track 201 (201, 211, 221) having at least the wobbling groove region, an inter-groove portion 202 and a track 203 having at least the linear groove region. These elements are formed substantially parallel to each other and alternately so as to construct a parallel groove continuity 100.

When the pitch between the center of the track 201 having the wobbling groove region and the center of the track 203 having the linear groove region is P, the wavelength of reproduction laser beam for playing back the information recording carrier 1 of the present invention is λ and the numerical aperture of an objective lens is NA, there is a relation of P<λ/NA.

The groove 201 (201, 211, 221) having the wobbling region wobbles due to frequency shift modulation and its plane structure is constituted of the high frequency portion 301 (301, 303, 305) and the low frequency portion 300 (300, 302, 304).

Digital data is recorded in the information recording carrier 1 of the present invention by frequency shift modulation. Then, because 0, 1 are recorded corresponding to a change of wobbling frequency, 0, 1 determination performance is excellent. Particularly, because no fine phase information is contained unlike phase shift modulation applied to the writable DVD, a low error rate can be obtained even under a relatively small C/N. Further, even if noise overlaps when a recording mark is recorded in the groove track (201, 203) or the inter-groove portion 202, data recorded wobblingly in the groove track is never disturbed.

As for mutual interference (cross-talk) of data in adjoining grooves, because the linear groove 203 is inserted between the grooves 201 (201, 211, 221) having the wobbling region, no cross-talk of address in adjacent tracks is generated.

Accordingly the data error by cross-talk is hardly generated, the address error rate can be maintained low even to a pattern in which a distance between adjacent tracks is changed momentarily like CLV.

The structure and effect of the information recording carrier 1 of the present invention have been described. The present invention is not restricted to the information recording carrier 1 shown in FIGS. 3 to 9 and may be modified and applied in various ways within the gist thereof.

For example, although sine wave is used as basic wave in description of the frequency shift modulation with reference to FIGS. 5 to 7, it is permissible to use cosine wave as the basic wave.

According to the present invention, the track 201 having at least the wobbling groove region, the inter-groove portion 202, and the track 203 having at least the linear groove region are formed alternately. Although the wobbling groove region provides the information recording carrier 1 constituted of at least frequency shift modulation, this may be applied to the disc-like information recording carrier in various ways.

For example, as described above, the information recording carrier may contain a plurality of enclosed tracks over 360°, the tracks being formed coaxially.

In the information recording carrier, these tracks may be constructed spirally without overlapping or connecting the track 201, the inter-groove portion 202 and the track 203.

If the entire information recording carrier is viewed, it is comprised of three spirals for the track 201, the inter-groove portion 202 and the track 203.

As a modification of this pattern, the wobbling groove region and the linear groove region may be inverted at every predetermined angle.

Although, in the above description, a method of recording data directly is used as the recording method, the present invention is not restricted to this direct recording.

That is, if long address data string is recorded, the direct recording may generate continuation of 0 or 1, so that direct current component may be generated in data. To avoid this phenomenon, it is permissible to adopt a method of recording base-band modulated data. Namely, 0 and 1 are converted to a different code preliminarily and continuation of 0 and 1 is made below a predetermined value. As such a method, it is permissible to use Manchester code, PE modulation, MFM modulation, M2 modulation, NRZI modulation, NRZ modulation, RZ modulation, differential modulation or the like independently or in combination.

As a base band modulation method particularly suitable for the information recording carrier 1 of the present invention, Manchester code (bi-phase modulation, 2-phase modulation) is available. According to this method, as shown in FIG. 10, 2 bits are allocated to 1 bit of data intended to be recorded. That is, 00 or 11 is allocated to data 0 intended to be recorded and 01 or 10 is allocated to data 1. Then, upon connecting of data, it is always necessary to begin with the inversion code of a code.

As described in FIG. 11, address data of 100001 turns to code string of 010011001101. Original address data is asymmetrical data which includes continuous four 0s and in which the appearance probability of 0 is twice 1.

If this is modulated, it is converted to symmetrical data in which continuous 0s or 1s are two max. and the appearance probabilities of 0 and 1 are equal. The base band modulation in which continuity of the same bits is restricted to a predetermined value or less has an effect of improving reading stability and therefore, this is a pre-processing suitable when long address data is handled.

Additionally, there is a method in which the address data is dissolved highly accurately and recorded dispersedly. For example, as a first example of address dispersed recording, by combining with dummy data "101", a combination of "101X" (X is 0 or 1) is recorded and this data string is disposed at every predetermined interval.

That is, as shown in FIG. 18, "101" is disposed at a predetermined interval (every 11 bits here) as data trigger Tr and subsequently, X is disposed. That is, if with "101" as data trigger Tr, only X just after the data trigger Tr is extracted, data can be restored.

In this example if "1" is considered to be data, data can be restored in the order of data presence, none, presence. Thus, "101" can be reproduced as address information. This method is valid for a format which permits data to be handled to be read with a time.

In the meantime, 1-bit data extracted at every predetermined interval is defined as word and it is assumed that address information is constructed by gathering words.

In other words, data to be recorded by frequency-shift modulation is address information, which is composed of data triggers provided at every predetermined interval and data allocated between these data triggers. In this information recording carrier, address information is recorded depending on presence or absence of this data.

As a modification of this method, as shown in FIG. 19, it is permissible to form the address information such that the data trigger Tr and data are set apart at the interval of specified bits (second example of address dispersed recording).

Here, data trigger Tr is "11", so that the data trigger is disposed at every 11 bits. Then, data is recorded at every predetermined interval depending on presence or absence of "101". That is, by fetching data from the fourth bit to the sixth bit subsequent to the data trigger Tr, 1-bit data can be restored.

Because this example enables data to be restored in the order of data presence, none and data presence, "101" can be reproduced as the address information. Because the data trigger Tr is apart from data, this recording method is capable of reducing reading errors.

As a third example of highly dispersed recording, the first specified data pattern (for example, "11") is disposed (recorded) at every specified interval. The second specified data pattern (for example "101") is disposed between the first specified data patterns. The position for disposing the second specified data pattern is located specified bits (distance or time) ahead of the first specified data pattern and particularly, two selectable positions are allocated.

Figure 20:
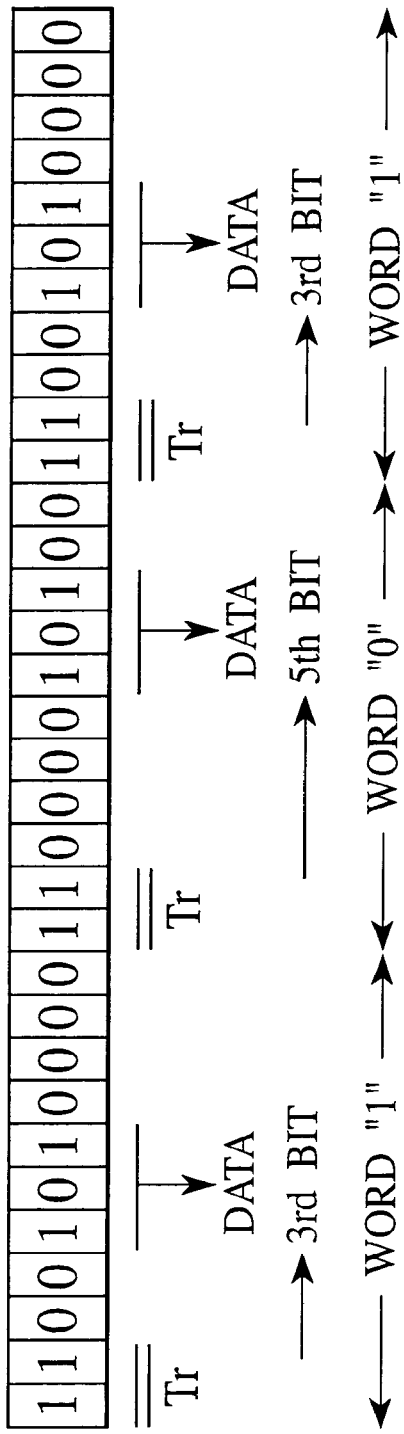
FIG. 20 is a diagram showing a third example of address information dispersion recording.

That is, as shown in an example of FIG. 20 (third example of address dispersed recording), as the first specified data pattern, the data trigger Tr "11" is disposed at every predetermined interval (every 11 bits here) and the second specified data pattern "101" is disposed therebetween. As the position for disposing the second specified data pattern, two ways are prepared, that is, from the third bit to the fifth bit or from the fifth bit to the seventh bit. After determining which position data is disposed at, decoding is carried out.

In this example, data is disposed in the order of third bit start, fifth bit start and third bit start, therefore "101" can be reproduced as the address information. Because this recording method allows whether or not data "101" can be read to be added as a criterion on reliability determination, this method is effective particularly when it is desired to provide the address information with high reliability.

In other words, data to be recorded by frequency shift modulation is address information and composed of data trigger provided at every predetermined interval and data allocated at a specified position between the data triggers. In this information recording carrier, the address information is recorded depending on a mutual distance between this data trigger and data.

As the third example of the highly dispersed recording, the method of dispersed recording using a difference in position between the first specified data pattern and the second specified data pattern has been described. If a pattern having an extremely high reading accuracy can be prepared as the specified data pattern, the first specified data pattern and the second specified pattern may be the same. That is, it is permissible to extract a specific pattern shorter than a predetermined time interval in which the specified data pattern is recorded and measure its distance interval (time interval) so as to decode the data.

Figure 21:
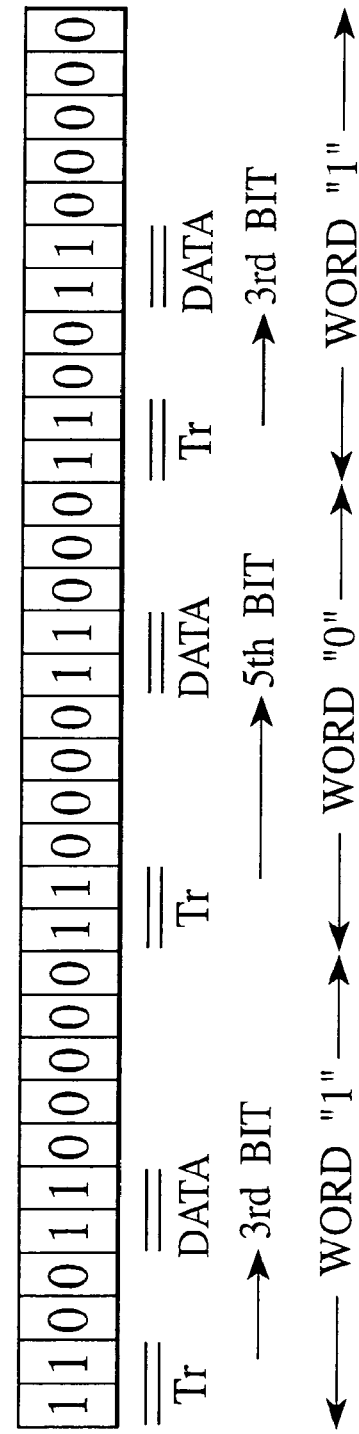
FIG. 21 is a diagram showing a fourth example of address information dispersion recording.

More specifically for example as shown in the fourth example of address dispersed recording of FIG. 21, the data trigger "11" is disposed at every predetermined interval (every 11 bits here) as the first specified data pattern, and the second specified data common to the Tr is disposed therebetween. As the position for disposing the second specified data pattern, two ways are prepared, that is, from the third bit to the fifth bit or from the fifth bit to the seventh bit and data decoding is carried out by determining which position data is disposed at. In this example, data is disposed in the order of third bit start, fifth bit start and third bit start, therefore "101" can be reproduced as the address information.

Since this recording method only has to prepare a specified data pattern, the reproducing circuit can be simplified.

Various kinds of highly dispersed recordings have been already described above. That is, according to these recording methods (any recording method), the address information is recorded as data divided to bits.

More specifically, first, dummy data of about several bits is prepared as data trigger Tr. Subsequently, a data string (for example, continuity of 0s) composed of continuity of single data is prepared and the data triggers Tr are disposed in the single data string at every predetermined interval. The address information which is divided to respective bits is recorded so as to convert part of the single data string according to a predetermined rule. Then, bits located at a position specified distance ahead of the data trigger are converted according to a predetermined rule and recorded.

On the other hand, upon reproduction, the data triggers Tr disposed at every predetermined interval are detected from a data string subjected to frequency shift modulation. Then, 1-bit data (corresponding to "word" in FIGS. 18 to 21) is extracted from data excluding the data triggers Tr by verifying with a predetermined rule. The extracted 1-bit data are accumulated so as to restore address information.

Because data recorded wobblingly is capable of handling a relatively large number of data even if the dispersed recording method is employed, it is capable of handling not only the address data but also auxiliary information.

At least a specified data can be selected from for example, type of information recording carrier, size of information recording carrier, estimated recording capacity of information recording carrier, estimated recording line density of information recording carrier, estimated recording line velocity of information recording carrier, track pitch of information recording carrier, recording strategy information, reproduction power information, manufacturer information, production number, lot number, control number, copyright related information, key for creating cipher, key for decipher, encrypted data, recording permission code, recording reject code, reproduction permission code, reproduction reject code and the like. These data may accompany error correction code.

Figure 12:
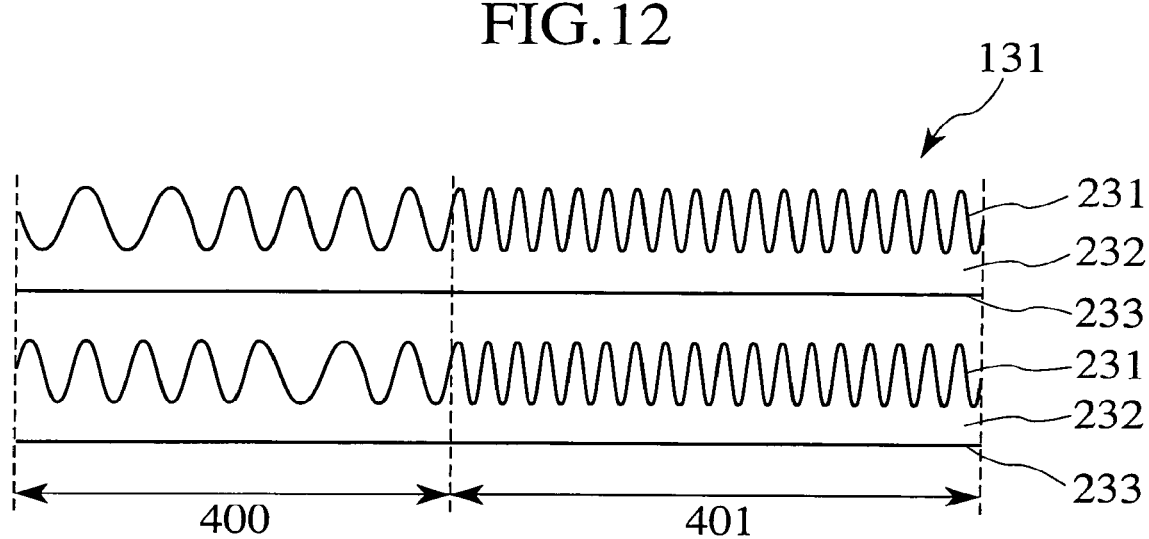
FIG. 12 is a diagram showing other structure of the groove formed in the information recording carrier of the present invention.

Since the address data is smaller than main information, the track 231 having wobbling groove region may be divided to two regions macroscopically as shown in FIG. 12.

That is, the two regions are frequency shift modulation region 400 in which the address data is recorded and single modulation region 401 for extracting clocks.

Hereinafter, the frequency shift modulation region 400 is called address region 400 and the single modulation region 401 is called clock region for convenience for explanation. As described up to here, the former is composed of high frequency portion and low frequency portion. The latter is composed of only specified frequency portion.

Although the basic wave shapes and amplitude amounts in these two regions may be different, they are preferred to be equal if simplification and stabilization of the recording circuit and reproducing circuit are considered. Although as regards the frequency, the high frequency portion, the low frequency and the clock region 401 may be different from each other in terms of the frequency, if any of the high frequency portion and the low frequency portion is equal to the clock region 401 in terms of the single frequency, the physical length for use in extracting the clock can be expanded to some extent. Consequently, stabilized extraction of the clock is facilitated, which is advantageous.

In border between these two regions, it is permissible to record the start bit signal, stop bit signal or synchronous signal which clarifies this division. For example, as an example of such a signal, a single space (having the same height as the groove portion 232) formed by cutting the track 231, a repetition pattern of pit and space and the like are suitable.

In FIG. 12, the shape of the basic wave in the clock region 401 is sine wave. The sine wave is preferable because a stabilized clock extraction is enabled for reproduction of clock region and no leakage of high frequency component occurs in user data recording. In the meantime, the basic wave shape in the clock region 401 may be also cosine wave.

Further, a single frequency for clock may be overlaid on the frequency shift modulation region 400. That is, it is permissible to overlay a frequency different from any of the high frequency side and low frequency side composing the frequency shift modulation address thereon. Further, it is also permissible to overlay any frequency of the high frequency side or the low frequency side on the frequency shift modulation address.

Likewise, it is also permissible to overlay a frequency an integer times or one an integer the frequency of the high frequency side or low frequency side.

Because even if clock frequency is overlaid on the frequency shift modulation address, frequency separation is enabled with a well known band path filter, the address and clock can be separated and reproduced individually. Therefore, even if the frequency shift modulation region 400 is formed over a long distance, stabilized reproduction is enabled because the clock can be extracted continuously.

Next, as application of the information recording carrier 1 of the present invention, adoption thereof to recently developed light transmission layer incident type information recording carrier will be described.

The light transmission layer incident type information recording carrier has a very thin light transmission layer of about 0.1 mm thick relative to its entire length of 1.2 mm different from a conventional information recording carrier and carried out recording or reproduction when recording laser beam or reproduction laser beam is irradiated thereon. Such a structure is capable of corresponding to a high numerical aperture NA and increase the recording density.

Figure 13:
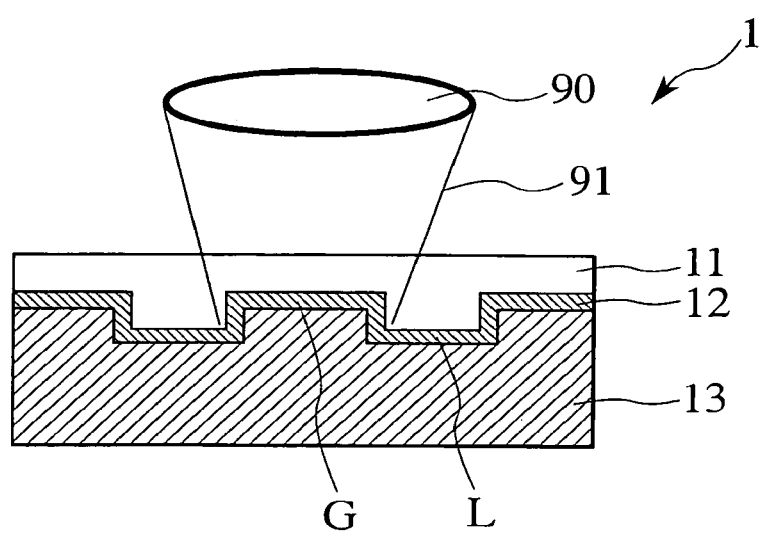
FIG. 13 is a sectional view of a thin light transmitting layer information recording carrier.

FIG. 13 shows schematically the sectional structure of the light transmission layer incident type information recording carrier 1 and the reproduction system thereof.

Referring to the same Figure, the light transmission layer incident type information recording carrier 1 comprises at least a supporting body 13, a recording layer 12 and a light transmission layer 11. The aforementioned minute pattern constituted of groove G and land L is formed on a side of the supporting body 13 in contact with the recording layer 12. Then, laser beam 91 for recording or reproduction is projected from the side of the light transmission layer 11 through an objective lens 90. Light passing the light transmission layer 11 is irradiated on the recording layer 12 so as to execute reproduction or recording/reproduction. Although light is projected from the side of the supporting body 13 in a conventional information recording carrier, the light transmission layer incident type information recording carrier 1 employs opposite light incident direction. As for the designation of the groove G and land L, according to definition by Japanese Industrial Standard (JIS), the groove L means a groove near the incident face while the land L means a groove far from the incident face (for example, JIS-X6271-1991).

FIG. 13 shows the positions of the groove G and land L based on this definition and in this example, the groove G is irradiated with light.

In case where the aforementioned address recording was adopted to the information recording carrier 1 having such a structure, which of the track 201 having the wobbling groove region, the track 203 having the linear groove region and the inter-groove portion 202 should be disposed in the groove G and land L was considered.

This problem is not only related to address data, but also deeply related to which of the groove G and the land L data should be recorded in if user records it in or reproduces from the recording layer 12.

As a result of consideration from such a viewpoint, it was found that generation of reproduction jitter and error rate could be suppressed if user's recording to the recording layer 12 was carried out selectively in only the groove G and recording repetition performance was excellent. This reason is that heat due to irradiation of the laser beam 91 is more likely to be accumulated in the groove G than the land L because the groove G is located more forward of (nearer) the laser beam 91 (side of the objective lens 90) than the land L.

As a result, not only the recording sensitivity in the groove G is intensified but also the shape of a recording mark formed there becomes uniform and therefore it is found that the groove G is capable of achieving ideal recording.

On the other hand, if the same mark is recorded in the land L, heat by irradiation of the laser beam 91 is more likely to be radiated than the groove G, so that the shape of the recording mark formed there becomes uneven. Thus, it is found that the land L is not capable of achieving ideal recording.

If recording/reproduction is restricted to the groove G, it is found that the track 201 having the wobbling groove region (and track 203 having the linear groove region) should be disposed on the side of the land L while the inter-groove portion 202 should be disposed on the side of the groove G.

Namely, if this structure is opposite, the laser beam 91 is irradiated to the center of the track 201 having the wobbling groove region, so that address is reproduced with an output about twice as compared to a case where it is disposed on the side of the land L. However, laser beam is irradiated to the center of the track 203 having the linear groove region in next track, so that no address is reproduced.

Therefore, only an address is reproduced every two turns and thus, this is not useful as the address of the information recording carrier 1.

In the meantime, a difference in height between the groove G and the land L (in other words, height of minute pattern) is preferred to be $\lambda/8n$ to $\lambda/20n$ if considering that push-pull reproduction is carried out. Meanwhile, n means refractivity at $\lambda$ of the light transmission layer 11. Particularly, because the refractivity of the recording layer 12 drops due to existence of the minute pattern 20, the land L is preferred to be shallower and its depth is preferred to be less than $\lambda/10n$ in order to prevent deterioration of jitter of the reproduction signal.

Further, because the output of the push-pull signal increases with the depth of the land L upon tracking, the limit value of tracking is preferred to be more than $\lambda/18n$. That is, $\lambda/10n$ to $\lambda/18n$ is preferable.

Assuming that an interval between the track 201 having the wobbling groove region and the track 203 having the linear groove region is pitch P (the interval between the inter-groove portions 202 is pitch P also), the P satisfies the relation of P<S with respect to reproduction spot diameter S. Here, the reproduction spot diameter is calculated with $S=\lambda/NA$ where the wavelength of laser beam used for reproduction is $\lambda$ and the numerical aperture of an objective lens is NA. In other words, the pitch P satisfies the relation of $P<\lambda/NA$.

For example because if the aforementioned bluish purple laser is used, $\lambda$ is in the range of 350 to 450 nm and if high NA lens is used, NA is 0.75 to 0.9, the pitch P is set to 250 to 600 nm.

Further, if a case of recording digital pictures by high definition television (HDTV) for about two hours is considered, the pitch P is preferred to be 250 to 450 nm.

Particularly, if NA is 0.85 to 0.9, the pitch is preferred to be 250 to 400 nm.

Particularly, if NA is 0.85 to 0.9 and A is 350 to 410 nm, A is preferred to be 250 to 360 nm.

The signal system used for recording into the recording layer 12 or for user recording may use for example, a modulation signal which is called (d, k) code. The (d, k) modulation signal can be used for not only fixed length code but also variable length code.

For example, as an example of (d, k) modulation for the fixed length code, EFM, EFM plus (8-16 modulation) with d=2, k=10; modulation signal (D8-15 modulation) described in Japanese Patent Application Laid-Open No. 2000-286709; (D1, 7) modulation (described in Japanese Patent Application No. 2001-080205) with d=1, k=7; modulation signal (D4, 6 modulation) described in Japanese Patent Application Laid-Open No. 2000-332613 with d=1, k=9; (3, 17) modulation with d=3, k=17 and the like are available.

Further, as an example of (d, k) modulation for the variable length code, preferably, modulation signal (1, 7 PP modulation) described in Japanese Patent Application Laid-Open No. HEI11-346154 (1999) with d=1, k=7; (4, 21) modulation with d=4, k=21 and the like are used.

Figure 14:
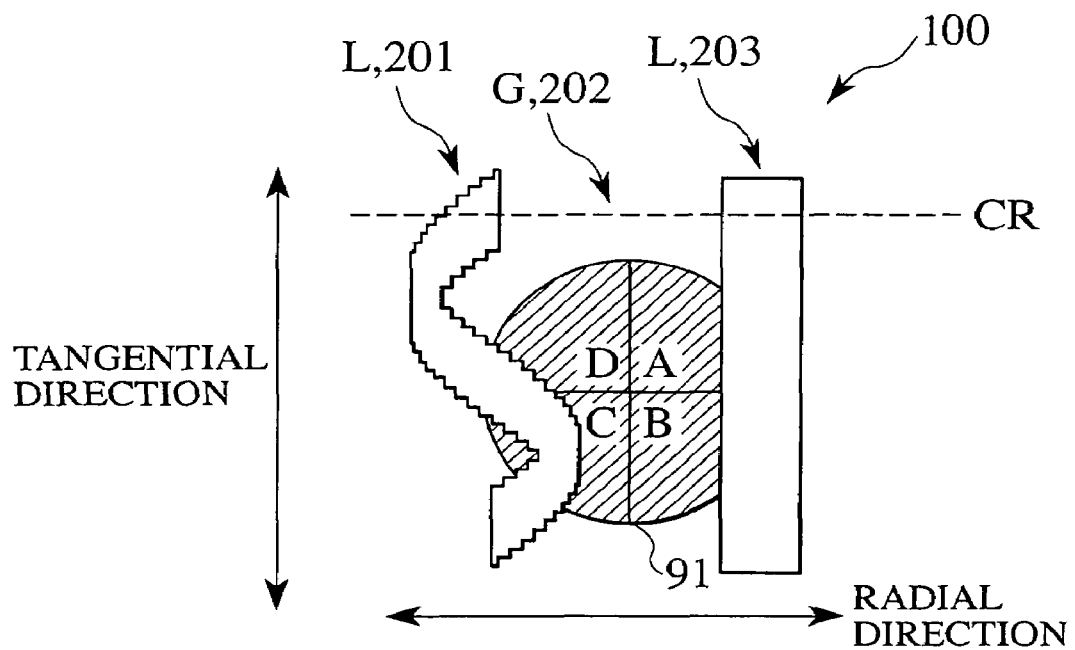
FIG. 14 is a plan view showing the information recording carrier of the present invention and its reproduction method.
Figure 15:
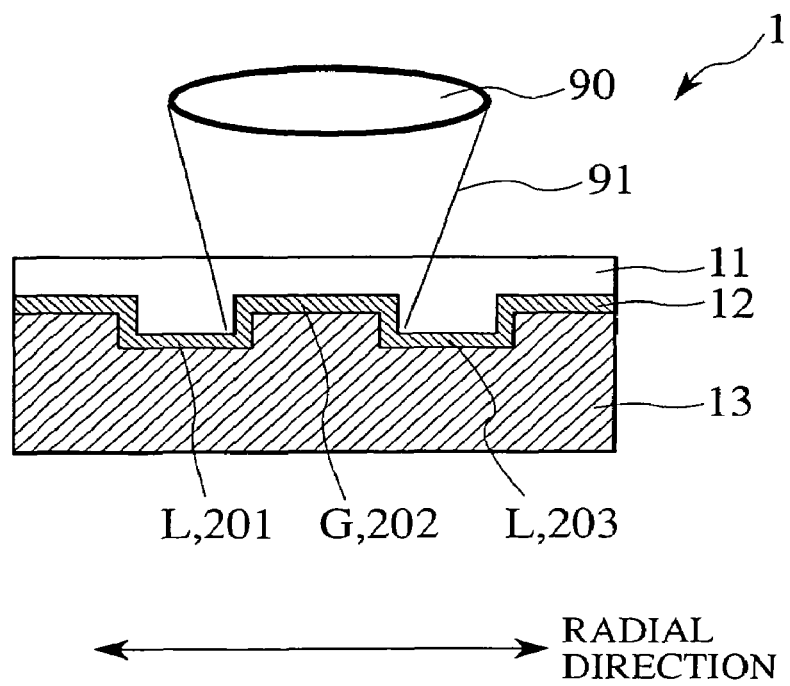
FIG. 15 is a sectional view showing the thin light transmitting layer information recording carrier and its reproduction method.
Figure 16:
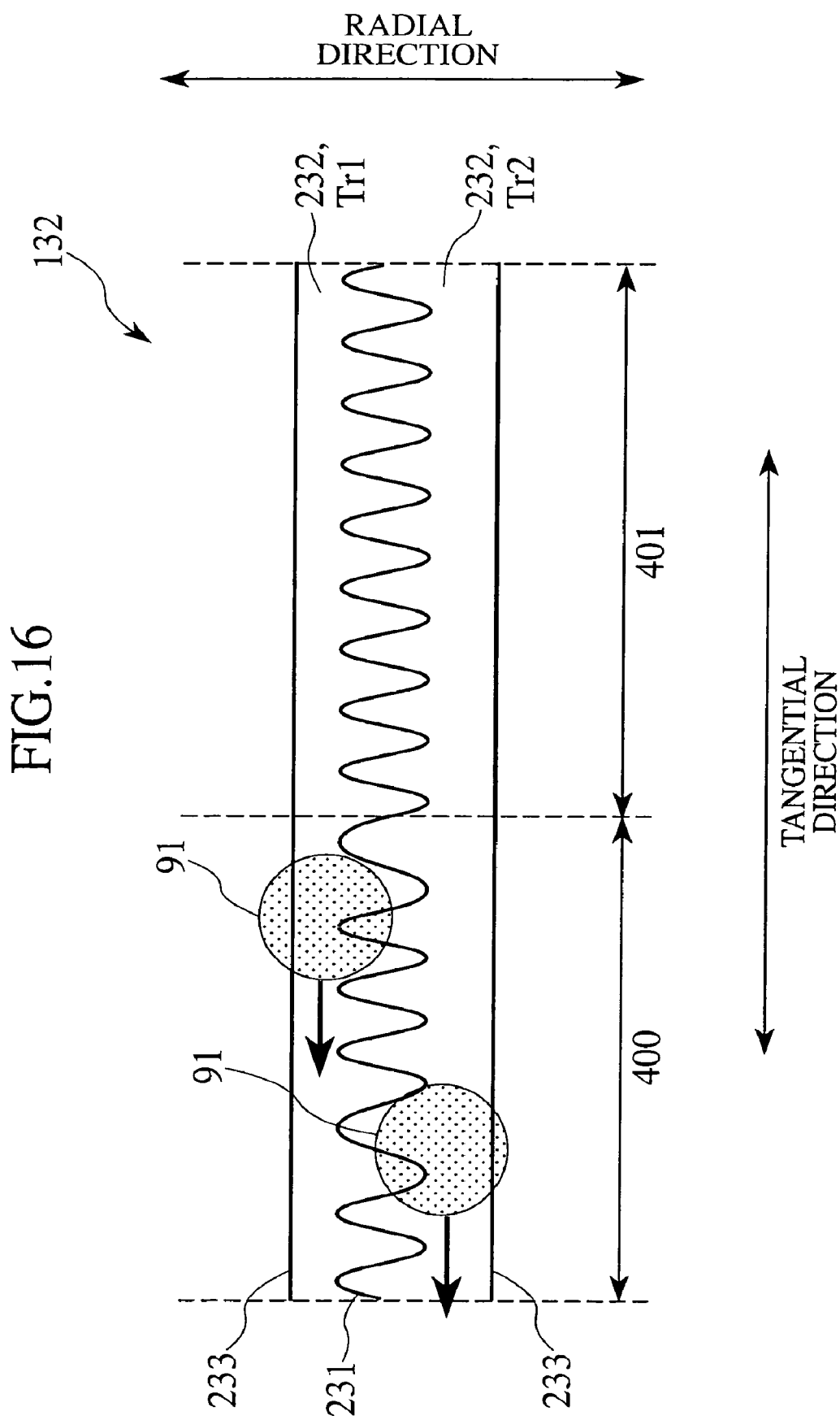
FIG. 16 is a plan view showing the information recording carrier of the present invention and its reproduction method.

Therefore, the sectional structure of the information recording carrier 1 and the reproduction method of the present invention are shown in FIGS. 15, 14, 16.

FIG. 15 shows the sectional structure of the information recording carrier 1 of the present invention, which comprises the supporting body 13, the recording layer 12 and the light transmission layer 11.

Here, a disc-like information recording carrier is indicated with a sectional view taken in the radial direction. The minute pattern (FIG. 6) is formed on a side in contact with the recording layer 12 of the supporting body 13. Particularly, the track 201 having the wobbling groove region and the track 203 having the linear groove region are disposed on the side of the land L, while the inter-groove portion 202 is disposed on the side of the groove G.

Laser beam 91 for recording or reproduction is projected from the side of the light transmission layer 11 through the objective lens 90. Light passing the light transmission layer 11 is irradiated on the recording layer 12 so as to execute reproduction or recording/reproduction.

FIG. 14 is a plan view of a minute pattern (parallel groove continuity) 100 for explaining the reproduction method. Therefore, the track 201 having the wobbling groove region and the track 203 having the linear groove region are disposed alternately and the inter-groove portion 202 is disposed therebetween.

FIG. 15 shows a sectional view taken along the line CR of FIG. 14. The track 201 having the wobbling groove region, the track 203 having the linear groove region and the inter-groove region 202 are disposed substantially in parallel to each other, so that they are extended vertically in the radial direction while in parallel in the tangential direction.

FIG. 14 shows the reproduction laser beam 91 also and spot light is concentrated on the inter-groove portion 202 (side of groove G) so as to execute reproduction or recording/reproduction. The reproduction laser beam 91 is projected to both walls of the track 201 having the wobbling groove region and the track 203 having the linear groove region.

Therefore, even if recording/reproduction is carried out in the inter-groove portion 202, the frequency shift modulation signal can be reproduced by push-pull method.

That is, by appropriately selecting a difference in output of a 4-division photo-detector incorporated in a reproduction pickup (not shown), the push-pull signal can be generated.

In FIG. 14, the laser beam 91 is projected to the photo detector which is divided to four sections, A, B, C, D. For example, by generating a difference in output in the radial direction, that is, (A+B)−(C+D), the push-pull signal can be obtained. As a result, frequency-shift modulated data can be reproduced favorably.

This push-pull signal becomes a means for being notified of which side the data is recorded on the right side or the left side (if the disc-like information recording carrier is employed, inner peripheral side or outer peripheral side) with respect to the inter-groove portion 202.

For example, by comparing the (A+B) signal with the (C+D) signal, a side in which the reproduction output deflects can be determined to be the recording side. This generates a strong effect if data recording is applied to address recording. That is, because in the information recording carrier 1 of the present invention, the address data is recorded alternately with the track 203 having the linear groove region, the address of only a track is outputted from every two tracks.

However, if which side the data is recorded on the right side or the left side (inner peripheral side or outer peripheral side in the disc-like information recording carrier) in the information recording carrier 1 of the present invention can be determined by the push-pull signal, new binary information is obtained, so that address of a track can be obtained in one track.

FIG. 16 represents a method for reproducing such address information from minute pattern 132 formed in the information recording carrier 1.

Referring to the same Figure, the minute pattern 132 is divided to two regions macroscopically, which are clock region 401 for extracting clocks and address region 400 in which address data is recorded. Then, the latter is composed of high frequency portion and low frequency portion.

The basic plane structure of FIG. 16 is the same as that of FIG. 12.

The reproduction light 91 traces a track from up to down as shown in FIG. 16. First, track 1 (Tr1, 232) is traced and then the track 2 (Tr2, 232) is traced. Although at this time, a signal recorded in the groove 231 having the wobbling region can be obtained using the (A+B)−(C+D) signal, the same signal is outputted from the track 1 (Tr, 232) and the track 2 (Tr2, 232). Therefore, the (A+B)−(C+D) signal does not indicate which an odd track is traced or an even track is traced.

However, if a determining means which determines that a side in which reproduction output deflects in a constant cycle is a recording side by comparing the (A+B) signal with the (C+D) signal is used here, which it is an odd track or an even track is determined so as to specify a track.

In case of FIG. 16, as a result of determination, a signal string of right 0, 1, 0, 1, 1 is obtained when Tr1 is reproduced and then, a signal string of left 0, 1, 0, 1, 1 is obtained when Tr2 is reproduced.

Using such a reproduction method enables address and track to be automatically and uniquely determined.

Meanwhile, such determination of odd/even tracks does not have to be always carried out in the address region 400. Since it is continuous from the clock region 401, the determination may be carried out in the clock region 401 before or after the address region 400 is read.

Further, the determination may be carried out with track odd/even determination pit provided especially in addition to the address region 400 and the clock region 401. Since the determining means at this time changes depending on allocation of the pit and kind of the recording code, the method is not restricted to comparison between the (A+B) signal and the (C+D) signal.

Here, the supporting body 13, the recording layer 12 and the light transmission layer 11 in FIG. 15 will be described in detail.

The supporting body 13 is a base having the function for holding the recording layer 12 and the light transmission layer 11 formed thereon mechanically. Any one of synthetic resin, ceramic and metal is employed as its material. As the synthetic resin, preferably, various kinds of thermoplastic resins and thermoset resin such as polycarbonate, poly methyl methacrylate, polystyrene, polycarbonate.polystyrene copolymer, polyvinyl chloride, alicyclic polyolefine, poly methyl pentene, and various kinds of energy beam setting resins (including examples of ultraviolet beam setting resin, visible light setting resin, electron beam setting resin) are used. In the meantime, they may be synthetic resins in which metallic powder or ceramic powder is mixed.

As an example of ceramic, soda lime glass, soda alumino silicate glass, boro-silicated glass, crystal glass and the like are available. Further, as an example of metal, a metallic plate having light transmission characteristic such as aluminum is also available.

For necessity of mechanical holding, preferably, the thickness of the supporting body 13 is 0.3 to 3 mm, more preferably 0.5 to 2 mm. In case where the information recording carrier 1 is disc-like, preferably, the thickness of the supporting body 13 is designed so that the total thickness of the supporting body 13, the recording layer 12, the light transmission layer 11 and the like is 1.2 mm for compatibility with a conventional optical disc.

The recording layer 12 is a thin film layer having the function for recording or rewriting information. As material of this recording layer 12, material which induces changes in reflectivity or refractivity or both of them before or after the recording, represented by phase change material, material which induces change in rotation angle before or after the recording represented by photo-magnetic material, and material which induces change in refractivity or depth or both of them before or after the recording represented by pigment material are employed.

Specific examples of the phase change material includes alloys of indium, antimony, tellurium, selenium, germanium, bismuth, vanadium, gallium, platinum, gold, silver, copper, aluminum, silicone, palladium, tin, arsenic (alloys include oxide, nitride, carbide, sulfide, fluoride). Particularly, alloys such as GeSbTe base, AgInTeSb base, CuAlSbTe base, AgAlSbTe base are preferable. These alloys can contain at least one element selected from groups consisting of Cu, Ba, Co, Cr, Ni, Pt, Si, Sr, Au, Cd, Li, Mo, Mn, Zn, Fe, Pb, Na, Cs, Ga, Pd, Bi, Sn, Ti, V, Ge, Se, S, As, Tl, In, Pd, Pt, Ni by 0.01 atom % or more to less than 10 atoms % in total.

As for the composition of each element, for example, as GeSbTe system, $Ge_2Sb_2Te_5$, $Ge_1Sb_2Te_4$, $Ge_8Sb_{69}Te_{23}$, $Ge_8Sb_{74}Te_{18}$, $Ge_5Sb_{71}Te_{24}$, $Ge_5Sb_{76}Te_{19}$, $Ge_{10}Sb_{68}Te_{22}$, $Ge_{10}Sb_{72}Te_{18}$, and a system in which metal such as Sn, In is added to the GeSbTe system are available. As AgInSbTe system, $Ag_4In_4Sb_{66}Te_{26}$, $Ag_4In_4Sb_{64}Te_{26}$, $Ag_2In_6Sb_{64}Te_{28}$, $Ag_3In_5Sb_{64}Te_{28}$, $Ag_2In_6Sb_{66}Te_{26}$, and a system in which metal or semiconductor such as Cu, Fe, Ge is added to the AgInSbTe system are available. Additionally, CuAlSbTe system and AgAlSbTe system are also available.

Specific examples of photo-magnetic material include alloys of terbium, cobalt, iron, gadolinium, chrome, neodymium, dysprosium, bismuth, palladium, samarium, holmium, proceodium, manganese, titanium, palladium, erbium, ytterbium, lutecium, tin and the like (alloys include oxide, nitride, carbide, sulfide, fluoride). Particularly, this material is preferred to be composed of alloy of transition metal and rare earth represented by TbFeCo, GdFeCo, DyFeCo and the like. Further, the recording layer 12 may be composed using alternately overlaid-layer film of cobalt and platinum.

As specific example of pigment material, porphyrin pigment, iodocyanin pigment, phthalocyanine pigment, naphthlocyanine pigment, azo dyestuff, naphthoquinone pigment, fulgide pigment, polymethyne pigment, acridine pigments are available.

In the meantime, the recording layer 12 may incorporate or be loaded with an auxiliary material in order to intensify its recording performance or reproduction performance as well as these materials which carry out recording.

For example, as the auxiliary material, it is permissible to use alloys of silicone, tantalum, zinc, magnesium, calcium, aluminum, chrome, zirconium and the like (alloys include oxide, nitride, carbide, sulfide, fluoride) and high reflective film (heat sink material of various alloys containing one or more of aluminum, gold, silver) such that it is overlaid. Particularly, if the recording layer 12 is composed of phase change material, the reflectivity can be adjusted to appropriate level (for example, reflectivity 12 to 24%) so as to increase the amount of reproduction light and improve rewriting frequency, reproduction characteristic, recording characteristic, reproduction stability and storage stability by overlaying dielectric material such as ZnS, SiO, SiN, SiC, AlO, AlN, MgF, ZrO on the aforementioned recording material.

The light transmission layer 11 has the function of introducing converged reproduction light to the recording layer 12 with little optical distortion.

For example, preferably, material whose transmissibility is more than 70%, more preferably more than 80% under reproduction wavelength of λ is used.

Since the light transmission layer 11 needs to have little optical anisotropy, it is composed of material whose refractivity is less than ±100 nm, more preferably less ±50 nm at 90° incident double path so as to suppress reduction of reproduction light.

As material having such characteristic, it is permissible to use synthetic resin such as polycarbonate, poly methyl methacrylate, cellulose triacetate, cellulose diacetate, polystyrene, polycarbonate.polystyrene copolymer, polyvinyl chloride, alicyclic polyolefine, poly methyl pentene.

The light transmission layer 11 may have the function for protecting mechanically and chemically. As material having such a function, it is permissible to use material having high stiffness, such as transparent ceramic (for example, soda lime glass, soda alumino silicate glass, boro-silicated glass, crystal glass), thermoset resin, energy line setting resin (for example, ultraviolet beam setting resin, visible light setting resin, electron beam setting resin).

In order to reduce double refraction (optical anisotropy), preferably the thickness of the light transmission layer 11 is than 2 mm, and more preferably less than 1.2 mm.

If the information recording carrier 1 is loaded on an information recording carrier playback unit having NA of less than 0.7, preferably the thickness of the light transmission layer 11 is less than 0.4 mm in order to suppress optical aberration when the information recording carrier 1 is inclined, and particularly when NA is more than 0.85, it is preferred to be less than 0.12 mm.

Further, the thickness thereof is preferred to be less than 0.02 mm so as to protect the recording layer 12 from being scratched. That is, if NA is more than 0.85, its preferable range is 0.02 to 0.12 mm.

Further, deflection in the thickness in a plane is preferred to be ±0.003 mm max, because the NA of the objective lens is large. Particularly when the NA of the objective lens is more than 0.85, it is preferred to be less than ±0.002 mm. Further, if the NA of the objective lens is 0.9, preferably, the thickness is less than ±0.001 mm.

In the meantime, the light transmission layer 11 is not restricted to a single-layer structure shown in FIG. 15, but may be of overlaid multiple layers having the same function.

Although not shown, it is permissible to form a well known electrostatic preventive layer, a lubrication layer, a hard coat layer or the like on a side opposite to the recording layer 12 of the light transmission layer 11.

As specific material of the lubrication layer, it is permissible to use liquid lubricant whose surface energy is adjusted by modifying hydrocarbon polymer molecules with silicone or fluorine. In the meantime, the thickness of the lubrication layer is preferred to be about 0.1 nm to 10 nm.

As specific material for the hard coat layer, it is permissible to use thermoset resin, various kinds of energy beam setting resin (including examples of ultraviolet beam setting resin, visible light setting resin, electron beam setting resin), humidity setting resin, multiple-liquid mixture setting resin, solvent contained thermoplastic resin, which allows 70% or more light having the wavelength $\lambda$ to be passed through.

Considering wear resistance of the light transmission layer 1, the hard coat layer is preferred to have the pencil scratch test value based on JIS standard K5400 which is above a specific value. The hardest material for the objective lens in the information recording carrier playback unit is glass and if considering this, the pencil scratch test value on the hard coat layer is preferred to be more than H.

If the test value is below this value, generation of dust and dirt due to scratch of the hard coat layer becomes conspicuous so that the error rate drops rapidly.

Further, the thickness of the hard coat layer is preferred to be 0.001 mm or more considering impact resistance and further less than 0.01 mm considering warp of the entire information recording carrier 1.

As another material for the hard coat layer, it is permissible to use a single unit such as carbon, molybdenum, silicone or alloy (including oxide, nitride, sulfide, fluoride, carbide), which allows 70% or more light having the wavelength $\lambda$ to pass through and has the pencil scratch test value of above H (film thickness 1 to 1000 nm).

Further, although not shown, it is permissible to print a label on a side opposite to the recording layer 12 of the supporting body 13. As printing material, it is permissible to use various kinds of energy beam setting resins (including ultraviolet beam setting resin, visible beam setting resin, electron beam setting resin) containing various kinds of pigments or dyes. The thickness is preferred to be 0.001 mm or more considering visibility and further, less than 0.05 mm considering warp of the entire information recording carrier 1, 2, 3, 4.

Further, hologram or visible minute pattern for recognizing the information recording carrier 1 may be formed in other region than a specific region used for recording.

Further, to improve mounting performance to a reproducing apparatus or a recording apparatus or protecting performance for handling, the entire information recording carrier 1 to 4 may be incorporated in a cartridge.

If the information recording carrier 1 to 4 is disc like, its size is not limited, but maybe selected from various sizes of 20 to 400 mm, for example, it may be 30, 32, 35, 41, 51, 60, 65, 80, 88, 120, 130, 200, 300, 356 mm.

In the meantime, as another application of the information recording carrier 1 of the present invention, it is permissible to employ saw tooth wave as its basic wave. That is, although not shown, the saw tooth wave can take two values by mild riseup/steep fall and steep riseup/mild fall. Because interference with the data recording method of the present invention is small, multi-value data can be recorded by combination. For example, if the frequency shift modulation is binary, four value data can be recorded by combination.

Further, a multi-layer stack like information recording carrier can be formed by expanding the information recording carrier 1 of the present invention. Particularly, as shown in FIG. 17, a two-layer information recording carrier 1 may be so constructed that address recording on the first layer is executed by frequency shift modulation with saw tooth wave type 1 as its basic wave while the address recording on the second layer is executed by frequency shift modulation with saw tooth wave type 2 as the basic wave.

Here, the saw tooth wave type 1 refers to for example, mild rise/steep fall and the saw tooth wave type 2 refers to for example, steep rise/mild fall. Such a structure enables rise vector and fall vector to be generated clearly by inputting reproduced push-pull signal into a high band filter and extracting its differential components, thereby enabling the layer to be determined.

That is, determining whether the first layer or the second layer can be carried out more quickly than decoding of address. Thus, this is advantageous for shortening access time for recording or reproduction.

Figure 17:
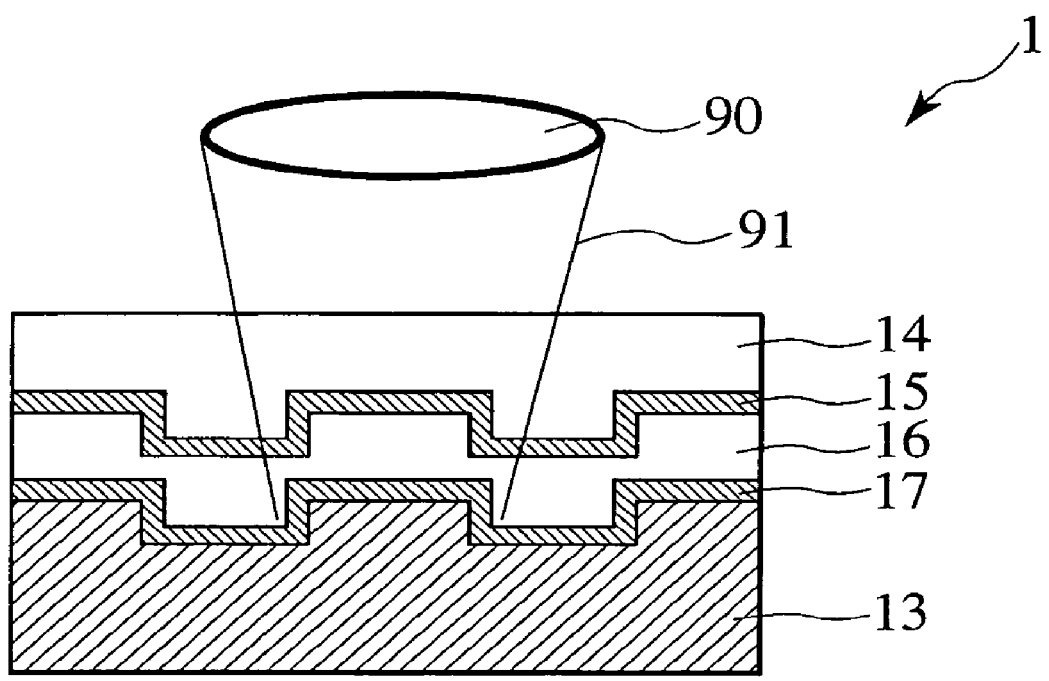
FIG. 17 is a sectional view of the thin light transmitting layer information recording carrier described in FIG. 13 reconstructed to have two layers.

FIG. 17 is a sectional view showing two-layered carrier gained by modifying the thin type light transmission layer information recording carrier described in FIG. 13.

The information recording carrier 1 comprises the supporting body 13, the first recording layer 17, the first light transmission layer 16, the second recording layer 15 and the second light transmission layer 14, these layers being overlaid in the order. Common description to FIG. 13 is omitted.

The function and composition material of the first recording layer 17 and the second recording layer 15, and the function and composition material of the first light transmission layer 16 and the second light transmission layer 14 are basically the same as the function and composition material of the recording layer 12 and the light transmission layer 11 described in FIG. 13. A different point is that optimized material is used for each of those components for the laser 91 to pass through the second recording layer 15 and be recorded in the first recording layer 17.

Next, a specific example of the present invention will be described.

EXAMPLE 1

A disc-like information recording carrier having the structure shown in FIG. 12 was manufactured.

The pitch P between the track 231 having the wobbling groove region and the track 233 having the linear groove region is 0.32 µm, the width of each groove is 0.16 µm and the width of the inter-groove portion 233 is 0.16 µm.

The track 231 having the wobbling groove region and the track 233 having the linear groove region are disposed in the land portion L in FIG. 13, while the inter-groove portion 232 is disposed in the groove portion G.

The track 231 having the wobbling groove region is comprised of address region 400 (5.5 µm long) and clock region 401 and six address regions are disposed each turn.

The address region 400 and the clock region 401 employ sine wave as their basic waves. The track 233 having the linear groove region employs 360° continuous linear groove.

In the address region 400, as shown in FIG. 9, by frequency shift modulation in which a difference in phase between the high frequency portion 305 and the low frequency portion 304 is ±π/7.6 and phase continuity at channel bit switching point is at random, address data was recorded in the information unit in which a wave in low frequency portion served as a channel bit.

In the meanwhile, the frequency of the low frequency portion is matched with the single frequency of the clock region 401. Further, the high frequency portion 305, the low frequency portion 304 and the clock region 401 have the same amplitude.

As pre-treatment for recording, address data was subjected to base band modulation with Manchester code and further differential modulation.

As the disc-like information recording carrier 1, a phase rewritable disc having the recording layer 12 made of mainly AgInSbTe was employed and this information recording carrier 1 which can execute recording/reproduction through the 0.1 mm light transmission layer 11 was completed.

The laser beam 91 was projected to the groove portion G in the disc-like information recording carrier 1 through the pickup 90 having the wavelength λ 405 nm (gallium nitride light emission device) and NA 0.85 so as to record/reproduce user data.

First, before recording, a single frequency was read from the clock region according to the push-pull method so as to measure C/N. Consequently, an excellent clock signal of 35 dB in C/N was reproduced without any interference of adjacent address (RBW1 kHz). Subsequently, an address region was reproduced selectively according to the push-pull method so as to measure the error rate of address. An excellent error rate of 4.5E-5 was found. Further, the inner periphery and outer periphery of the address could be determined excellently.

Subsequently, user recording was executed into the inter-groove portion 232 in the disc-like information recording carrier 1. More specifically, random data of 2 T-8 T was recorded such that it was overlaid 10 times by using modulation signal (17 PP modulation) described in Japanese Patent Application Laid-Open No. H11-346154 (1999).

The shortest mark length (2 T) was set to 0.151 μm. When this recording signal was reproduced, an excellent error rate of jitter of 8.7% and rate 4E-6 was obtained. The error rate of address was 7E-5 when measured again and this was excellent error rate although a slight increase in error was recognized. No interference between address information and user data was recognized. Determination of the inner periphery and outer periphery of address could be carried out excellently without being disturbed.

EXAMPLE 2

A disc like information recording carrier 1 having the structure shown in FIG. 12 was manufactured.

The pitch P between the track 231 having the wobbling groove region and the track 233 having the liner groove region is 0.32 μm, the width of each groove is 0.16 μm and the width of the inter-groove portion 232 is 0.16 μm.

The track 231 having the wobbling groove region and the track 233 having the linear groove region are disposed in the land L in FIG. 13 and the inter-groove portion 232 is disposed in the groove G.

The track 231 having the wobbling groove region is comprised of address region 400 (5.5 μm long) and clock region 401 and six address regions are disposed each turn.

The address region 400 and the clock region 401 employ sine wave as their basic waves. The track 233 having the linear groove region employs 360° continuous linear groove.

In the address region 400, by frequency shift modulation in which a difference in phase between the high frequency portion 305 and the low frequency portion 304 is ±π/2.5 and phase continuity at channel bit switching point is maintained, address data was recorded in the information unit in which a wave in low frequency portion served as a channel bit.

In the meanwhile, the frequency of the low frequency portion is matched with the single frequency of the clock region 401. Further, the high frequency portion 305, the low frequency portion 304 and the clock region 401 have the same amplitude.

As pre-treatment for recording, address data was subjected to base band modulation with Manchester code and further differential modulation.

As the disc-like information recording carrier 1, a phase rewritable disc having the recording layer 12 made of mainly AgInSbTe was employed and this information recording carrier 1 which could execute recording/reproduction through the 0.1 mm light transmission layer 11 was completed.

The laser beam 91 was projected to the groove portion G in the disc-like information recording carrier 1 through the pickup 90 having the wavelength λ 405 nm (gallium nitride light emission device) and NA 0.85 so as to record/reproduce user data.

First, before recording, a single frequency was read from the clock region 401 according to the push-pull method so as to measure C/N. Consequently, an excellent clock signal of 35 dB in C/N was reproduced without any interference of adjacent address (RBW1 kHz). Subsequently, an address region was reproduced selectively according to the push-pull method so as to measure the error rate of address. An excellent error rate of 2.5E-5 was found. Further, the inner periphery and outer periphery of the address could be determined excellently.

Subsequently, user recording was executed into the inter-groove portion 232 in the disc-like information recording carrier 1. More specifically, random user data of 2 T-10 T and 13 T (synchronous signal) was recorded such that it was overlaid 10 times by using modulation signal (D4, 6 modulation) described in Japanese Patent Application No. 2001-080205.

The shortest mark length (2 T) was set to 0.154 μm. When this recording signal was reproduced, an excellent error rate of jitter of 8.6% and rate 3.5E-6 was obtained. The error rate of address was 3E-5 when measured again and this was excellent error rate although a slight increase in error was recognized. No interference between address information and user data was recognized. Determination of the inner periphery and outer periphery of address could be carried out excellently without being disturbed.

EXAMPLE 3

A disc-like information recording carrier having the structure shown in FIG. 12 was manufactured.

The pitch P between the track 231 having the wobbling groove region and the track 233 having the linear groove region is 0.32 μm, the width of each groove is 0.16 μm and the width of the inter-groove portion 233 is 0.16 μm.

The track 231 having the wobbling groove region and the track 233 having the linear groove region are disposed in the land portion L in FIG. 13 while the inter-groove portion 232 is disposed in the groove portion G.

The track 231 having the wobbling groove region is comprised of address region 400 (30 μm long) and clock region 401 and three address regions are disposed each turn.

The address region 400 and the clock region 401 employ sine wave as their basic waves.

The track 233 having the linear groove region employs 360° continuous linear groove.

In the address region 400, by frequency shift modulation in which a difference in phase between the high frequency portion and the low frequency portion is ±π/11 and phase continuity at channel bit switching point is at random, address data was recorded in the information unit in which ten waves in low frequency portion served as a channel bit.

In the meanwhile, the frequency of the low frequency portion is matched with the single frequency of the clock region 401. Further, the high frequency portion 305, the low frequency portion 304 and the clock region 401 have the same amplitude.

As pre-treatment for recording, address data was subjected to base band modulation with Manchester code and further differential modulation.

As the disc-like information recording carrier 1, a phase rewritable disc having the recording layer 12 made of mainly Ge doping SbTe was employed and this information recording carrier 1 which could execute recording/reproduction through the 0.1 mm light transmission layer 11 was completed.

The laser beam 91 was projected to the groove portion G in the disc-like information recording carrier 1 through the pickup 90 having the wavelength λ 405 nm (gallium nitride light emission device) and NA 0.85 so as to record/reproduce user data.

First, before recording, a single frequency was read from the clock region according to the push-pull method so as to measure C/N. Consequently, an excellent clock signal of 35 dB in C/N was reproduced without any interference of adjacent address (RBW1 kHz). Subsequently, an address region was reproduced selectively according to the push-pull method so as to measure the error rate of address. An excellent error rate of 1E-4 was found. Further, the inner periphery and outer periphery of the address could be determined excellently.

Subsequently, user recording was executed into the inter-groove portion 232 in the disc-like information recording carrier 1. More specifically, random data of 3 T-11 and 12 T (synchronous signal) was recorded such that it was overlaid 100 times by using modulation signal (D8-15 modulation) described in Japanese Patent Application Laid-Open No. 2000-286709.

The shortest mark length (3 T) was set to 0.185 μm. When this recording signal was reproduced, an excellent error rate of jitter of 7.7% and rate 8E-7 was obtained. The error rate of address was 2.5E-4 when measured again and this was excellent error rate although a slight increase in error was recognized. No interference between address information and user data was recognized. Determination of the inner periphery and outer periphery of address could be carried out excellently without being disturbed.

Points of the Present Invention

The examples of the present invention have been described above with reference to the examples 1 to 3. The main feature of the present invention is that the information recording carrier having at least the groove wobbling region is employed and that data is recorded wobblingly into this wobbling region by frequency shift modulation. Consequently, even if a mark is recorded in the recording layer so that mixing occurs, the address can be reproduced at a low error rate.

The second main feature of the present invention is the information recording carrier in which the wobbling groove and the linear groove are disposed alternately. This can reduce reproduction cross-talk with adjacent track very remarkably. The examples above 1 to 3 are examples containing these two features however, the present invention is not restricted to these examples.

As evident from the above description, in the information recording carrier of the present invention, plural grooves formed in the information recording carrier have at least wobbling regions and data is recorded wobblingly in this wobbling region by frequency shift modulation. As a result, digital data such as address information can be read out excellently by separating reproduced data depending on difference in frequency. Particularly, if the phase relation between the high frequency portion and the low frequency portion is set to $\pm(\pi/20.5)$ to $\pm(\pi/0.75)$, the digital data can be read at a low error rate.

Particularly if the track having the wobbling groove region modulated by frequency shift modulation and the track having the linear groove region are disposed alternately, digital data such as address information can be read out excellently without cross-talk from data reproduced from the track having the wobbling groove region and the track having the linear groove region.

Further, if any mark such as user data is recorded in the inter-groove portion between the track having the wobbling groove region and the track having the linear groove region, mutual interference between the track having the wobbling groove region and the track having the linear groove region, which are located adjacent this inter-groove portion, hardly occurs. Thus, an information recording carrier capable of holding a high density recording capacity can be provided without falling user recording capacity to be recorded in each track in the inter-groove portion.

It should be understood that many modifications and adaptations of the invention will become apparent to those skilled in the art and it is intended to encompass such obvious modifications and changes in the scope of the claims appended hereto.

What is claimed is:

1. An information recording carrier having minute pattern including plural grooves or lands formed to be substantially in parallel and adjacent each other, comprising:

a supporting body having the minute pattern;

a recording layer formed on the minute pattern formed on the supporting body; and a light transmission layer formed on the recording layer, wherein when a pitch of each groove or land is P, a wavelength of a laser beam is λ and a numerical aperture of an objective lens is NA, the minute pattern is formed under a relation of P<λ/NA, wherein the plural grooves or lands have at least a wobbling region and data is recorded wobblingly in the wobbling region by frequency shift modulation, and wherein a phase relation between the high frequency portion and the low frequency portion composing the frequency shift modulation is $\pm(\pi/20.5)$ to $\pm(\pi/0.75)$.

2. A method of reproducing an information recording carrier as recited in claim 1, comprising:

irradiating the laser light on the recording layer through the light transmission layer in such a way that the laser light tracks the grooves or lands therebeneath;

detecting the laser light reflected by the recording layer; and recognizing the frequencies that are used in frequency shift modulation through the detected laser light.

* * * * *